B. A. BRIGDEN.
COPYING AND ENLARGING CAMERA.
APPLICATION FILED DEC. 13, 1920.
1,400,412.
Patented Dec. 13, 1921
3 SHEETS—SHEET 1.
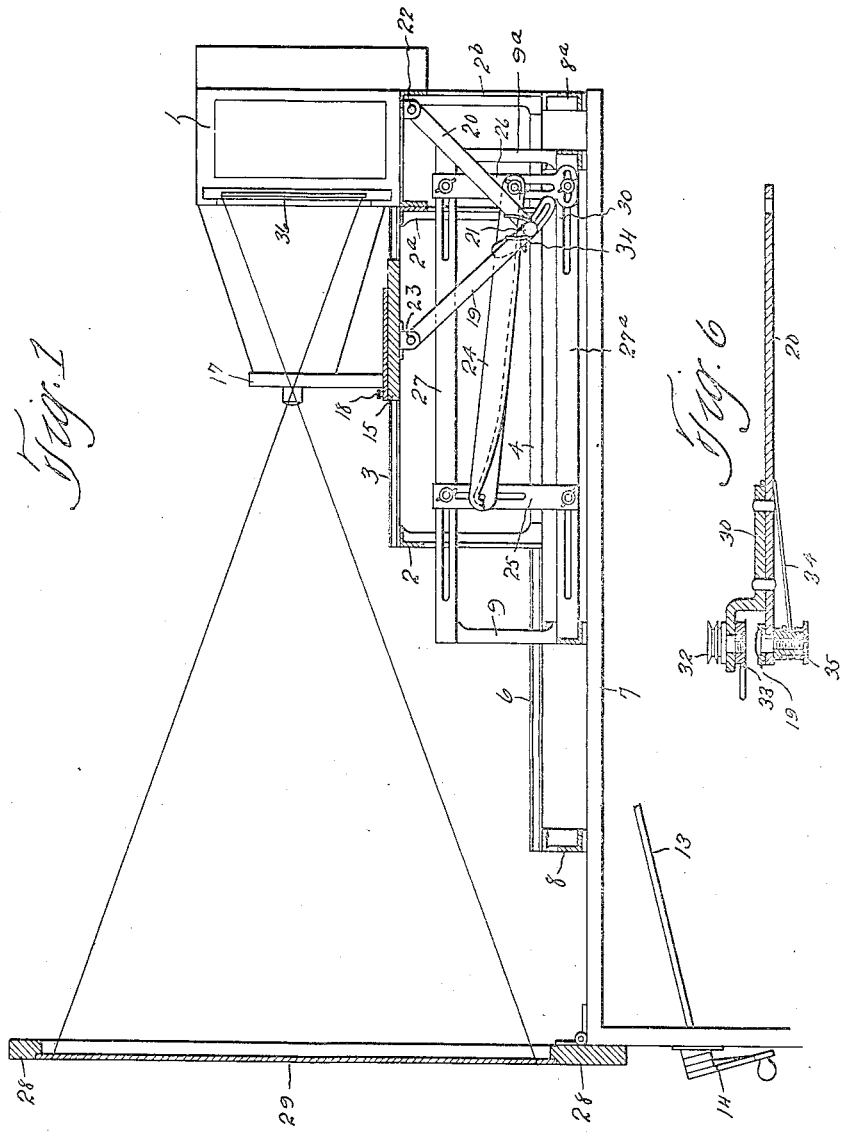

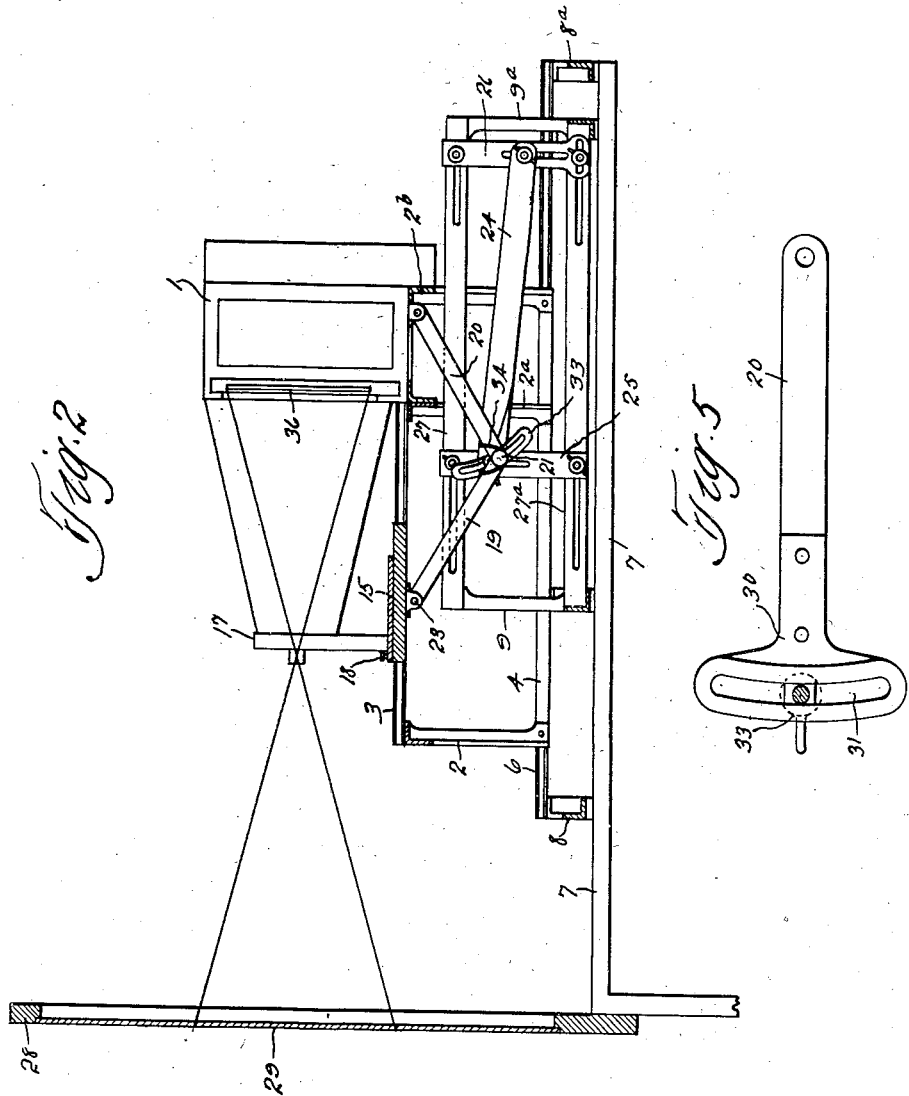

B. A. BRIGDEN.
COPYING AND ENLARGING CAMERA.
APPLICATION FILED DEC. 13, 1920.
1,400,412.
Patented Dec. 13, 1921.
3 SHEETS—SHEET 3.
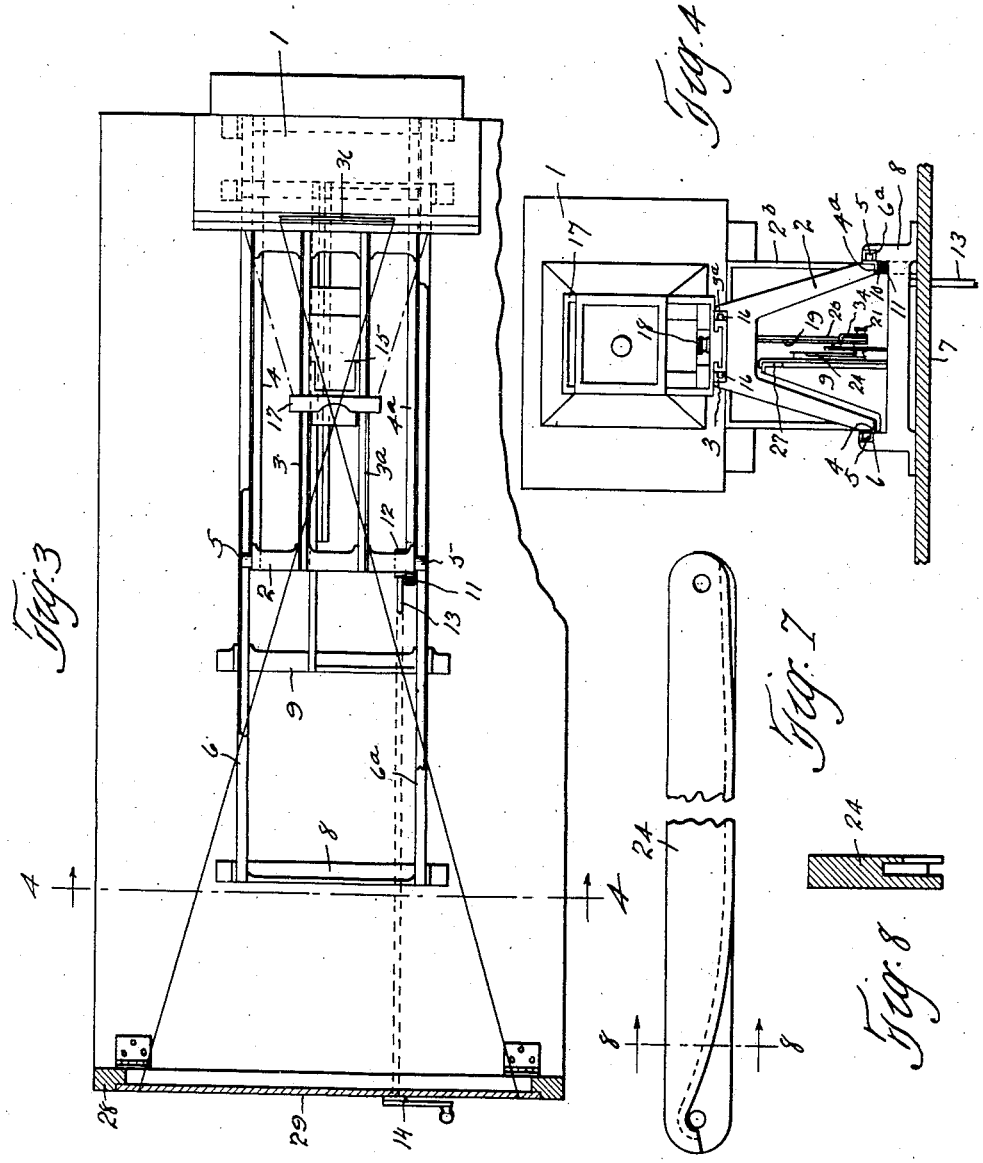
Inventor
B. A. Brigden
By John A. Bommhardt
Attys.

UNITED STATES PATENT OFFICE.

BURT A. BRIGDEN, OF EAST CLEVELAND, OHIO, ASSIGNOR OF ONE-HALF TO FRED R. BILL, OF CLEVELAND, OHIO.

COPYING AND ENLARGING CAMERA.

1,400,412.  Specification of Letters Patent.  Patented Dec. 13, 1921.

Application filed December 13, 1920. Serial No. 430,294.

*To all whom it may concern:*

Be it known that I, BURT A. BRIGDEN, a citizen of the United States, residing at East Cleveland, in the county of Cuyahoga and State of Ohio, have invented certain new and useful Improvements in Copying and Enlarging Cameras, of which the following is a specification.

This invention relates to cameras for copying and enlarging work and has for its object to obtain automatically a correct focus on a sensitive surface, of the image projected from the surface to be copied, for all degrees of enlargement or reduction within the scope of the camera.

The parts of this device are, a base to which is fixed a support for the sensitive surface, and movably mounted on this base is a camera support or truck with fixed support for the surface to be copied; movably mounted on the truck is a lens carrier. The lens carrier is connected with the rear end of the truck by a toggle-joint and their relative movement is governed by a cam plate fixed to the base against which runs a grooved wheel attached to the toggle-joint.

The movement of the camera support or truck toward or from the support for the sensitive surface may be accomplished by means of a rack and pinion as shown or by other suitable means.

In the drawings: Figure 1 is a side elevation partly in section showing the camera in a back position. Fig. 2 is a side elevation with camera in a forward position. Fig. 3 is a plan view with camera in back position. Fig. 4 is an elevation showing camera, lens carrier and other parts as seen from the front. Figs. 5 and 6 plan and section of part of toggle joint. Figs. 7 and 8 plan and section of cam plate.

The drawings show the focusing device adapted to an enlarging camera. The camera 1 is mounted on a camera support or truck formed by three pairs of legs 2, 2ª and 2ᵇ, channel irons 3 and 3ª and metal angles 4 and 4ª. A small wheel or roller 5 projects from each end of the metal angles 4 and 4ª into grooves of the channel irons 6 and 6ª fixed to the base 7 by brackets 8 and 8ª and the cam brackets 9 and 9ª. To the underside of angle 4ª is fixed a rack 10 (Fig. 4) meshed with a pinion 11 (Figs. 3 and 4) which has bearings fixed to the base and which is driven by a worm 12, shaft 13 and crank 14.

The lens carrier 15 has a small roller 16 at each corner running in grooves of the metal channels 3 and 3ª and the lens board 17 is slidably mounted on the carrier 15 and secured by set screw 18.

Arms 19 and 20 are pivoted together at 21 and arm 20 is pivoted at 22 to the truck and arm 19 to the lens carrier at 23. The cam plate 24 is adjustably mounted on the slotted verticals 25 and 26. These vertical plates are adjustably mounted on slotted metal angles 27 and 27ª fixed to vertical brackets 9 and 9ª which are fixed to the base. Attached to the base is the frame 28 carrying the glass 29 through which the image is projected to a sensitive surface which must be in contact with it. Figs. 5 and 6 show arm 20 of the toggle-joint to which is fixed a slotted bracket 30. The slot 31 is an arc concentric with the pivot pin at 22. The grooved wheel 32 is adjustable in the slot 31 and secured by nut 33. A spring 34 held by pivot bolt 35 engages both arms of the toggle-joint, tending to increase the angle between them and with sufficient force to move the lens carrier away from the camera. The grooved wheel 32 engages the cam plate 24 and during the forward or backward movement the width of the angle between arms 19 and 20 and the distance between the lens board 17 and the negative 36 will be governed by the shape of the cam. The slot 31 in the bracket 30 permits adjustment of the wheel 32 for a lens that may not be of the exact focal length for which the cam is shaped and will accommodate for as much as one inch difference in focal length without changing cams.

To set the device at adjustment a selected cam is placed on the supports 25 and 26, with all set-screws loose; then move the vertical support 25 to the proper register for the cam and set the screws top and bottom, leaving screws loose at the ends of the cam and bottom of support 26. The camera and lens carrier are then moved until the image is perfectly sharp at an enlargement of 1½ diameters; the lens carrier is then set against movement; then engage the grooved wheel under the cam and move the wheel mounting in the slot 31 until the wheel fits into small curve at the end of the cam, set the nut 33 and the cam to the support 25, then release the lens carrier and move the camera to a back position to get a large increase in the diameter of the image and focus sharply by moving the back end of the cam to the proper position, then set all screws when a correct focus will be obtained in any position to which the camera may be moved. A cam may be used for lenses of a wide range of focal length by adjustment of its position but the resulting focus is an approximation only, even if sufficiently close for ordinary use. For this reason I prefer to use the correct forms for the lenses to be used and providing for small adjustment only.

The lens board 17 is slidably mounted in the lens carrier to permit a very short focus lens to be used without closing too much the angle formed by the arms of the toggle-joint when in the back position and to prevent too wide an angle in the front position when a long focus lens is used.

The cam supports permit the use of very long or short cams and the longer the focal length of the le..s the shorter the cam. quired.

It will be obvious that the shape of the cam will govern the relative movement between the camera and the lens carrier as the former is slid back and forth. The lens carrier will, for example, when the camera is advanced have a corresponding forward movement increased by the variation incident to the toggle and cam.

I claim:

1. The combination with a frame, and a sliding camera and lens carrier mounted thereon, of a cam on the frame, and a toggle one arm of which is connected to the camera, and the other to the lens carrier, the joint of the toggle arms being provided with means to cause the same to follow the cam.

2. The combination with a frame, and a sliding camera and lens carrier mounted thereon, of a cam on the frame, and a toggle one arm of which is connected to the camera, and the other to the lens carrier, the toggle arms being provided adjacent the joint thereof with means to cause the same to follow the cam, the cam being adjustable with respect to the line of movement of the camera.

3. The combination with a frame, and a sliding camera and lens carrier mounted thereon, of a cam on the frame, and a toggle one arm of which is connected to the camera, and the other to the lens carrier, the toggle arms being provided adjacent the joint thereof with means to cause the same to follow the cam, the cam being adjustable in a plane perpendicular to the line of movement of the camera.

4. The combination with a frame, and a sliding camera and lens carrier mounted thereon, of a cam on the frame, and a toggle one arm of which is connected to the camera, and the other to the lens carrier, the toggle arms being provided adjacent the joint thereof with means to cause the same to follow the cam, the cam being adjustable parallel to the line of movement of the camera.

5. The combination with a frame, and a sliding camera and lens carrier mounted thereon, of a cam on the frame, and a toggle one arm of which is connected to the camera, and the other to the lens carrier, the toggle arms being provided adjacent the joint thereof with means to cause the same to follow the cam, the cam being adjustable both perpendicular and parallel to the line of movement of the camera.

6. The combination with a frame, and a sliding camera and lens carrier mounted thereon, of a fixed cam on the frame, and a toggle one arm of which is connected to the camera and the other to the lens carrier, the toggle arms being provided with a device to cause the same to follow the cam, and said device being adjustable to vary its relation to the joint between the two arms.

7. The combination with a frame, and a sliding camera and lens carrier mounted thereon, of a fixed cam on the frame, and a toggle one arm of which is connected to the camera and the other to the lens carrier, the toggle arms being provided with means to cause the same to follow the cam, one of said arms being provided with a transverse curved slot and a grooved wheel adjustably mounted in said slot.

8. The combination of a frame, a sliding support mounted thereon, a camera on said support, a lens carrier slidable on said support, a toggle one arm of which is connected to said support and the other to the lens carrier, a cam mounted on the frame, and spring means to cause the joint of the toggle arms to follow the cam.

In testimony whereof, I do affix my signature in presence of two witnesses.

BURT A. BRIGDEN.

Witnesses:
  JOHN A. BOMMHARDT,
  BESSIE F. POLLAK.